United States Patent Office 3,302,881
Patented Feb. 7, 1967

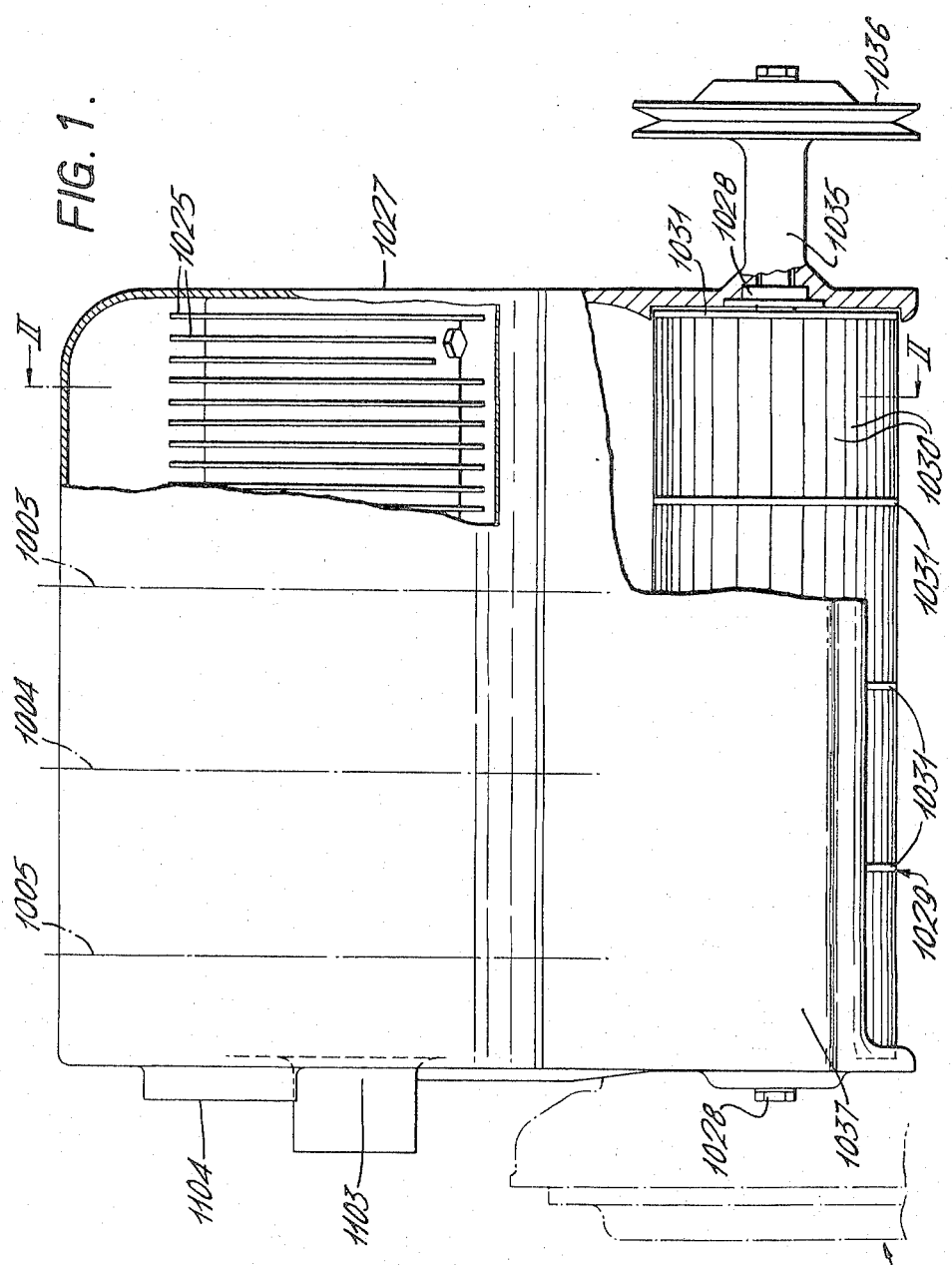

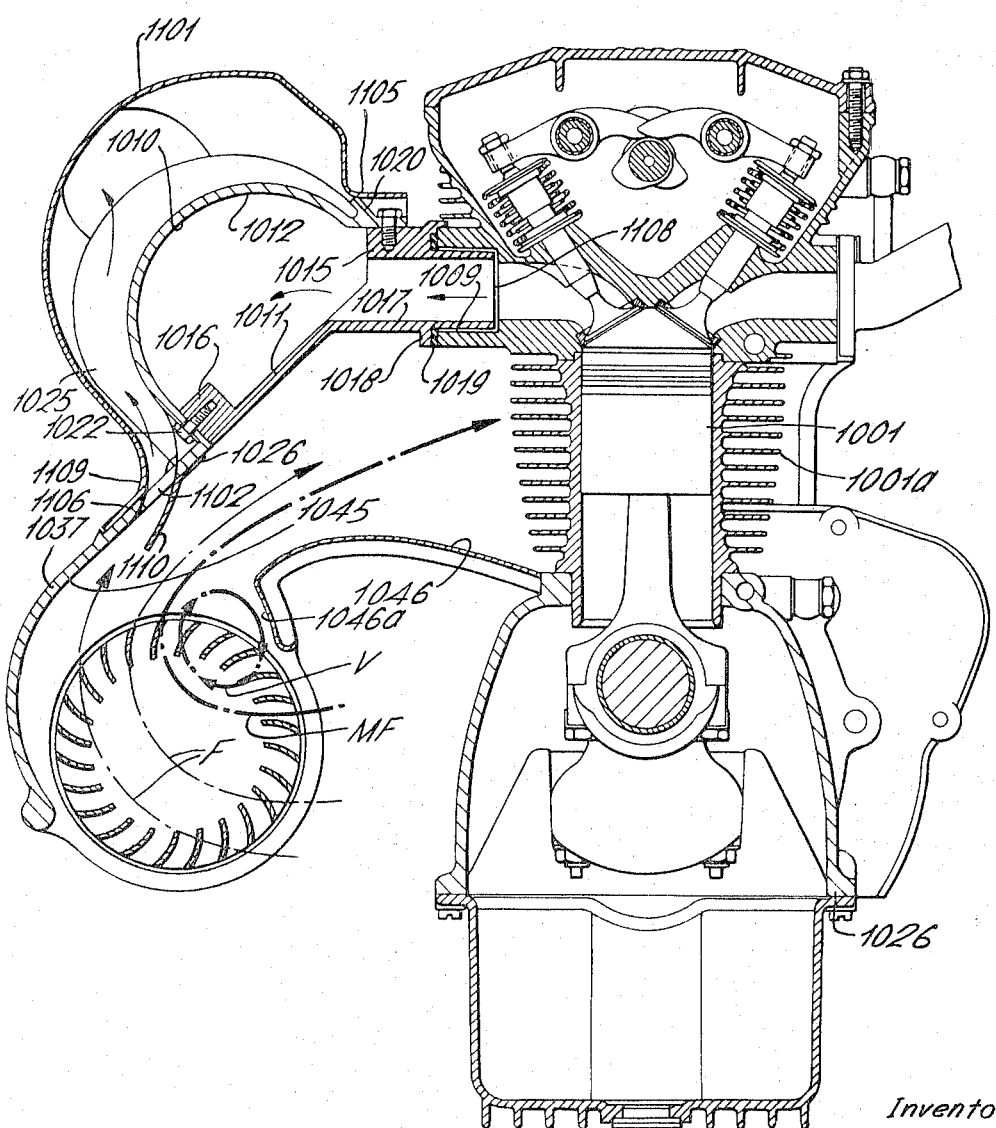

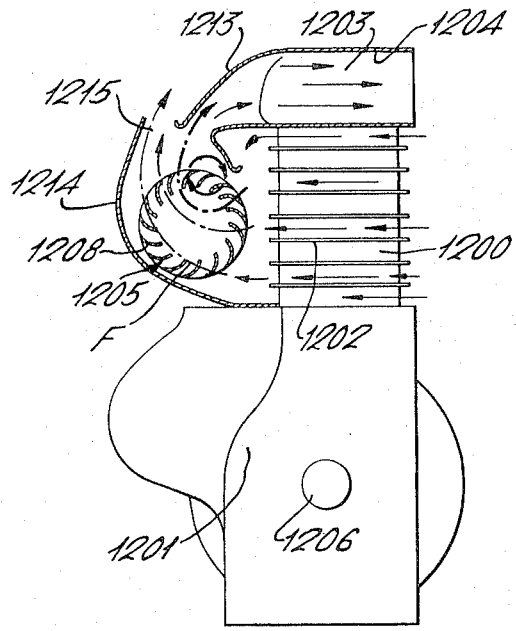
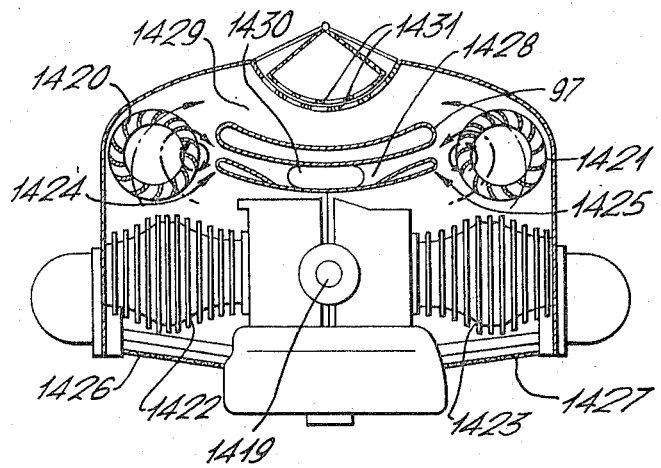

3,302,881
AIR COOLED ENGINES AND VEHICLE
HEATING SYSTEMS
Nikolaus Laing, Aldingen, near Stuttgart, and Bruno Eck,
Cologne-Klettenberg, Germany, assignors, by mesne assignments, to Laing Vortex, Inc., New York, N.Y.
Original application Sept. 5, 1962, Ser. No. 221,624, now
Patent No. 3,236,215, dated Feb. 22, 1966. Divided
and this application Dec. 30, 1965, Ser. No. 517,663
Claims priority, application Germany, Dec. 7, 1956,
L 26,393, L 26,394
6 Claims. (Cl. 237—12.3)

This application is a division of our copending application Serial No. 221,624 dated September 5, 1962, now Patent No. 3,236,215, itself a continuation-in-part of application Serial No. 701,266 dated December 6, 1957, now abandoned. The invention relates to air-cooled engines and heating systems for vehicles having passenger compartment.

The main object of the invention is to provide a compact form of air-cooled vehicle engine wherein part of the cooling air can be used for heating the passenger compartment.

With this object in view the invention provides apparatus comprising an internal combustion engine, with at least one finned cylinder and an exhaust pipe, a cross flow blower mounted on the engine to cause a flow of air past hot parts of the engine, means dividing said air flow into two streams and means to supply the heated air of one stream to the vehicle passenger compartment.

A cross flow fan is herein defined as one comprising a cylindrical bladed rotor mounted for rotation about its axis in a predetermined direction and defining an interior space, and guide means defining with the rotor an entry region and a discharge region, the guide means and rotor co-operating on rotation of the latter in said predetermined direction to induce a flow of air from the entry region through the path of the rotating blades of the rotor to said interior space and thence again through the path of said rotating blades to the discharge region. Preferably according to the invention the guide means and rotor co-operate to set up a vortex of Rankine character having a core region eccentric of the rotor axis and a field region which guides the fluid so that flow through the rotor is strongly curved about the vortex core.

In one preferred embodiment of the invention, the blower is upstream of the engine and delivers cooling air into a diffuser leading to the engine cylinder or cylinders. A deflector in the diffuser catches a proportion of the flow and passes it into a duct which conveys it over the exhaust pipe to the passenger compartment. This arrangement is particularly useful in an engine having a bank of cylinders in line; the exhaust pipe or manifold can be made to run parallel to the crankshaft, and the blower can also be mounted parallel to the crankshaft and opposite the cylinders. The vehicle heating air stream is then collected from over the whole length of the diffuser and passed over the pipe or manifold in a direction transverse to its length before being conveyed lengthwise of the pipe to a connection to the passenger compartment.

The invention contemplates also that air for the vehicle passenger compartment may be heated by the engine cylinders. In one arrangement, a cross flow blower arranged at the side of a cylinder sucks air over the lower part thereof and returns a proportion of the air back over the cylinder head, normally the hottest part of the engine, the remaining flow being used for heating. In another possible arrangement air passed over a cylinder or cylinders is discharged into two diffusers, the higher pressure flow being used for vehicle heating.

In all cases the invention provides for a single blower to supply both engine cooling and vehicle heating air, and permits control of the latter with little effect on the engine cooling.

Further features and advantages of the invention will become apparent from the following description of preferred embodiments thereof given by way of example with reference to the accompanying diagrammatic drawings, in which:

FIGURE 1 is a side elevation of apparatus according to the invention including an air cooled vehicle engine, parts being cut away to show the interior of the engine;

FIGURE 2 is a transverse section through the engine of FIGURE 1 taken on the line II—II therein;

FIGURE 3 is an end view of a further embodiment of the invention with the blower and associated parts shown in cross-section, and FIGURE 4 is a transverse section of yet another embodiment of the invention where the engine cylinders are in flat 4 arrangement.

Referring to FIGURES 1 and 2 of the drawing, the engine there shown and designated generally 1000 comprises four similar cylinders 1001 arranged in line with their axes in a common vertical plane. One cylinder has its axis on the section plane indicated at II—II while the axes of the others are indicated at 1003, 1004 and 1005. The crankcase block and flywheel casing 1006 are not illustrated in detail as their construction forms no part of the present invention. It is to be understood however that the crankshaft (not shown) has its axis horizontal in the vertical plane of the cylinder axes and that the cylinders 1001 are mounted individually on the crankcase block. It will be seen that the engine is shown broken away in FIGURE 1, and it is to be understood that such parts as are not shown are of conventional construction and form no part of the present invention.

Each cylinder 1001 has an exhaust outlet 1008 in the form of a tube with a counter bore 1009. The outlets 1008 discharge into a manifold designated generally 1010 extending the length of the engine formed by a lower manifold casting 1011 and an upper manifold portion 1012 bolted thereto. The lower manifold casting 1011 provides a generally rectangular plate 1014 which extends downwardly and away from the outlets 1008 and terminates at top and bottom in flanges 1015 and 1016. Four tubular connections 1017 project from the plate so as to enter the counter bores 1009, while flanges 1018 on the connections serve to clamp individual annular gaskets 1019 against the end faces of the outlets 1008. It will be understood that the lower manifold casting 1011 is tightened against the cylinders 1001 by means not shown and that the pressure so produced is taken on the gaskets 1019.

The upper manifold portion 1012 has the approximate form of a semi-cylinder with a flange 1020 along one side which mates with, and is secured by bolts 1021 to, the upper flange 1015 on the lower manifold casting 1011. The other side of the manifold portion 1012 mates with, and is secured by bolts 1022 to, the lower flange 1016 on the casting 1011. An end wall (not shown) closes one end of the manifold 1010 and an exhaust connection 1024 is provided at the other. The manifold portion 1012 carries closely spaced radial fins 1025 which are united adjacent the flange 1020 by means of a continuous lip 1026.

A pair of main transverse or end walls 1027 embracing the four cylinders 1001 and extending therefrom to the side where the exhaust manifold 1010 is situated, each transverse wall mounting a bearing 1028. Between the walls 1027 and by means of the bearings 1028 a blower rotor 1029 is mounted for rotation about a horizontal axis parallel to the crankshaft axis and somewhat below the level of the top of the crankcase block 1006. The blower rotor 1029 comprises a series of similar sheet metal rotor blades 1030 arranged in a ring and running parallel to the rotor axis between pairs of supporting discs 1031. The disc 1031 at the left-hand end of the rotor 1029 carries a stub shaft (not shown) journalled in the left-hand end bearing 1028. The right-hand disc 1031 is secured to a shaft 1035 mounting a pulley wheel 1036 adapted for connection to the engine crankshaft by means of a V-belt (not shown) which may also drive a dynamo (not shown). The rotor 1029, shaft 1035 and pulley wheel 1036 form a rigid assembly rotating together as a unit.

A main longitudinal wall 1037 extends between the end walls 1027 and fairs with the lower face of the plate 1014 whereby the wall 1037 and plate 1014 present towards the rotor 1029 a continuous guide surface 1045. A second guide surface 1046 is provided by a rectangular piece of sheet metal bent to the shape illustrated in FIGURE 3 and located between the transverse walls 1027 with one longitudinal edge against the crankcase block 1006. The guide surface 1046 has a portion 1046a defining a gap converging with the rotor 1029 in the direction of rotor rotation as shown by the arrow 1048 and a further portion 1046b merging with the portion 1046a and forming with the guide surface 1045 a diffuser 1049. At their lines of nearest approach to the rotor both guide surfaces 1045 and 1046a are well spaced therefrom.

In operation the rotor 1029 and guide surface portion 1046a co-operate to set up a cylindrical vortex having a core region indicated at V which is eccentric to the rotor axis and guides air twice through the rotor blades 1030 in a direction at right angles to the rotor axis, as shown by the flow lines F and MF. The velocity of air flow near the vortex core V as shown by the flow line MF is greater than the velocity remote therefrom. This flow of greater velocity detaches itself from the surface 1046b and, being somewhat reduced in velocity due to mixing and to the effect of the diffuser 1049, impinges on the cylinders 1001 at about their head. Although the head is subjected to the most powerful cooling, there is air flow distributed over the whole height of the cylinders 1001. The cylinders are finned as shown at 1001a, which, while it assists heat dissipation by providing a greater surface area to the air also produces a resistance thereto. The air pressure rises somewhat in the diffuser 1049 so as to be able to overcome this resistance.

If desired to control the cooling of the engine a butterfly valve may be pivotally mounted within the diffuser 1049. This may be automatically actuated whereby when the engine cools the valve pivots to closed position and when the engine heats the valve opens.

Throttling the flow past the cylinders reduces the power consumption of the rotor, so that it may become convenient to provide excess cooling capacity and operate normally in the throttled condition.

A sheet metal cowling 1101 extends over the manifold 1010 with constant arcuate cross-section between a first end wall (not shown) aligned with one end of the manifold and a second end wall 1103 aligned with the other end of the manifold and containing an outlet 1104 for connection to the interior of the vehicle. The cowling 1101 carries uninterrupted upper and lower flanges 1105 and 1106 running the length of the manifold 1010 with the lower flange 1106 overlying and being secured to the wall 1037 in spaced relation to the lower side of the manifold and the upper flange 1105 making sealing contact with the lip 1026. An opening, made up of a series of slots 1102, is formed in the wall 1037 adjacent the manifold 1010 so as to lead air which has passed the blower rotor 1029 into the duct 1107 formed between the upper manifold portion 1012 and the cowling 1101. The lower sides 1108 of the slots 1102 are curved and co-operate with a curved transition portion 1109 at the root of the lower flange 1106 to provide a smooth guide surface for air into the space 1107. A sheet metal deflector 1110 runs the length of the manifold inside wall 1037 and fairs into the upper sides 1111 of the slots 1102 to provide a smooth second guide surface opposite that previously mentioned. As the deflector 1110 projects into the air stream from the rotor 1029 a proportion of that stream is deflected thereby and guided by the surfaces mentioned into the duct 1107. Air flows first of all between the fins 1025 and around the manifold 1010 in a direction transverse to its length, by reason of the cowling 1101 lying close to the fins adjacent the slots 1102. Thereafter the air flows lengthwise of the duct towards the outlet 1104.

Warm air is ducted from the outlet 1104 to the vehicle passenger compartment in any convenient manner and subjected to control arrangements of conventional type, whether manual, automatic or both.

It is to be noted that any throttling of the air stream past the cylinders will have negligible effect on the vehicle heating air. Conversely, the heating air may be throttled as desired without substantially affecting the cooling of the engine cylinders.

It should be noticed that the joints of the manifold 1010 are so constructed that any leakage therefrom discharges into the engine-cooling air where it is dissipated harmlessly, rather than into the vehicle-heating air where the carbon monoxide present would constitute a danger to the occupants of the vehicle.

It will also be seen that the arrangement is compact; that the cooling air is directed over the whole of each cylinder but chiefly at the head where most heat has to be removed; that the only change in direction of the cooling air between the rotor 1029 and final discharge thereof is due to the presence of the cylinders themselves so that resistance is minimized and what there is helps the removal of heat from the surfaces of the cylinders; and that the cooling of the engine and heating of the vehicle is obtained by a single rotatable unit comprising blowers 1029 and 1034 which can be driven by an existing V-belt.

FIGURE 3 shows a diesel engine comprising a group of cylinders 1200 mounted in line, on a crankcase block 1201 the cylinders each having fins 1202 over their bodies and separately ducted heads 1203, the duct walls being shown at 1204. Each engine has a blower rotor 1205 arranged with its axis parallel to the crankshaft shown diagrammatically at 1206 with each rotor extending over the length of the group of cylinders which it is intended to cool. Each rotor 1205 comprises curved blades 1208 arranged in a ring and extending parallel to the rotor axis between supporting end discs 1209, and cooperate with a guide wall 1210 to produce a vortex with core V and flow lines F and MF, in the manner previously described.

FIGURE 3 shows the rotor 1205 opposite the lower part of the cylinders 1200 and drawing air across them.

The lower cylinder head duct wall 1204 is continuous with the rotor guide wall 1210 and the high velocity flow MF is guided over the head 1203. The upper cylinder head duct wall 1204 has an extension 1213 curved down over the rotor. Extension 1213 defines, with a further guide wall 1214 extending from the crankcase block 1201 around the rotor 1205, a gap 1215 through which the slower part of the rotor throughput is discharged for use in heating the vehicle.

This embodiment of the invention provides a strong flow of cooling air over the cylinder head 1203 and since the high velocity flow MF is drawn from just below the head, the upper parts of the cylinders 1200 are cooled somewhat more than their lower parts.

FIGURE 4 shows a horizontally-opposed vehicle engine and has two contra-rotating cylindrical bladed rotors 1420 and 1421 arranged symmetrically parallel to the crankshaft 1419 with one over each set of the cylinders 1422 and 1423. Guide means 1424 and 1425 cooperate with the rotors 1420 and 1421 respectively to generate an eccentric cylindrical vortex having a core indicated at V, the vortex guiding the flow through the rotor as shown at F. The rotors receive air which has passed through turbulence-creating grids 1426 and 1427 and over the cylinders which are finned. Air leaving the rotors enters the central symmetrical diffusers 1428 and 1429 with the first receiving a narrow range of high-velocity flow tubes and the second the remainder of the air. Air from the diffuser 1428 is conveyed to the interior of the vehicle to heat it, a duct for this purpose leading away from the space in a direction parallel to the crankshaft 1419 as shown at 1430. The diffuser 1429 discharges centrally upwards through a pair of part-cylindrical perforated plates 1431 one of which is movable to put the holes in and out of register. The throughput of the rotors 1420 and 1421 and hence the cooling of the cylinders 1422 and 1423 can be controlled by movement of the movable plate 1431.

It should be appreciated that the diffusers 1428 and 1429 are in fact double diffusers, as each diverges from the ends where air enters, to the middle, where it leaves. This enables the whole arrangement to be completely symmetrical.

I claim:

1. An air-cooled engine and heating system for a vehicle having a passenger compartment: comprising an internal combustion engine having at least a pair of cylinders in line, a crankshaft and an exhaust pipe, a bladed cylindrical rotor mounted opposite the cylinders for rotation about an axis parallel to that of the crankshaft, first and second guide walls extending from adjacent the rotor on opposite sides thereof respectively to the lower and upper ends of the cylinders, end walls joining the guide walls, said guide walls forming a diffuser and co-operating with the rotor on rotation thereof to set up a flow of air from the side of the rotor opposite the diffuser through the path of the rotating blades of the rotor and thence again through the path of the rotating blades to the diffuser, a duct about the exhaust pipe, an opening in the second diffuser wall leading into the duct, and a deflector in the diffuser to separate off a portion of the flow therein and pass it into the duct for heating by the exhaust pipe and delivery to the vehicle passenger compartment.

2. Apparatus as claimed in claim 1, wherein the exhaust pipe extends parallel to the line of cylinders, and said second wall opening and said deflector extend substantially over the length of the diffuser between the end walls, for flow of air over the exhaust pipe transverse to its length.

3. Apparatus as claimed in claim 2, wherein a wall of said exhaust pipe forms part of the second guide wall, and another wall of said exhaust pipe bounds said duct.

4. Apparatus as claimed in claim 2, wherein the exhaust pipe has finned upper surface and wherein a duct wall extends around said upper surface from said second guide wall where it lies close to the fins to a position where it is well spaced therefrom, the opening leading air between the fins.

5. An air cooled engine and heating system for a vehicle having a passenger compartment: comprising an internal combustion engine with at least one finned cylinder and an exhaust pipe, a cross flow blower mounted on the engine to cause a flow of air past hot parts of the engine, means dividing said air flow into two streams and means to supply the heated air of one stream to the vehicle passenger compartment wherein said blower is mounted downstream of said cylinder, and wherein said blower is positioned to turn flow from the cylinder back towards the head thereof and said flow dividing means comprises a wall extending from the head into the pressure region of said blower, the stream to one side of said wall being turned through 180° and returning past the head, and the other stream being turned through a lesser angle.

6. An air cooled engine having a crankshaft and heating system for a vehicle having a passenger compartment: comprising an internal combustion engine with at least one finned cylinder and an exhaust pipe, a cross flow blower mounted on the engine to cause a flow of air past hot parts of the engine, means dividing said air flow into two streams and means to supply the heated air of one stream to the vehicle passenger compartment wherein said blower is mounted downstream of said cylinder, and wherein the engine comprises two banks of cylinders each having a blower with its axis parallel to the crank shaft and discharging into a first and second diffuser separated by a longitudinal wall providing said flow dividing means, each of said diffusers diverging towards the central plane between said blocks and said first and second diffusers leading respectively to centrally positioned common outlets.

References Cited by the Examiner

UNITED STATES PATENTS

| 1,282,590 | 10/1918 | Kernohan | 123—41.64 X |
| 1,359,727 | 11/1920 | Munson. | |
| 1,409,822 | 3/1922 | Brock. | |
| 1,662,486 | 3/1928 | Ashley | 237—12.3 |
| 1,683,602 | 9/1928 | Brockway | 123—41.61 |
| 2,175,533 | 10/1939 | Ledwinka | 123—41.65 |

FOREIGN PATENTS 929,296  6/1955  Germany.

EDWARD J. MICHAEL, *Primary Examiner.*